US008937645B2

(12) United States Patent
Vandewalle et al.

(10) Patent No.: US 8,937,645 B2
(45) Date of Patent: Jan. 20, 2015

(54) CREATION OF DEPTH MAPS FROM IMAGES

(75) Inventors: Patrick Luc E. Vandewalle, Eindhoven (NL); Christiaan Varekamp, Eindhoven (NL); Reinier Bernardus Maria Klein Gunnewiek, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 855 days.

(21) Appl. No.: 13/139,862

(22) PCT Filed: Dec. 14, 2009

(86) PCT No.: PCT/IB2009/055727
§ 371 (c)(1),
(2), (4) Date: Jun. 15, 2011

(87) PCT Pub. No.: WO2010/070568
PCT Pub. Date: Jun. 24, 2010

(65) Prior Publication Data
US 2011/0249099 A1    Oct. 13, 2011

(30) Foreign Application Priority Data
Dec. 19, 2008   (EP) ...................................... 08172237

(51) Int. Cl.
*H04N 13/02*   (2006.01)
*G06T 7/00*    (2006.01)

(52) U.S. Cl.
CPC ..... *G06T 7/0065* (2013.01); *G06T 2207/10012* (2013.01); *G06T 2207/10021* (2013.01); *G06T 2207/30228* (2013.01)
USPC .......................................................... 348/47

(58) Field of Classification Search
CPC .................. G06T 7/0065; G06T 2207/10012; H04N 13/0003
See application file for complete search history.

(56) References Cited

U.S. PATENT DOCUMENTS

| 7,085,409 B2 | 8/2006 | Sawhney |
| 2008/0143823 A1 | 6/2008 | Jin |
| 2009/0196492 A1* | 8/2009 | Jung et al. ..................... 382/154 |

FOREIGN PATENT DOCUMENTS

| EP | 1465115 A2 | 10/2004 |
| EP | 1862969 A1 | 12/2007 |
| WO | 2007140638 A1 | 12/2007 |

OTHER PUBLICATIONS

Bebie, Thomas et al "SoccerMan—Reconstructing Soccer Games from Video Sequences" Proc. IEEE Intl Conf. on Image Processing, 1998, pp. 898-902.

(Continued)

*Primary Examiner* — Huy T Nguyen

(57) ABSTRACT

A method of generating a plurality of depth maps for a plurality of images comprises receiving a first image, obtaining information relating to the shot defined by the first image, generating a depth map for the first image according to a first schema, receiving a second image, obtaining information relating to the shot defined by the second image, detecting a change in the obtained information between the first and second image, and generating a depth map for the second image according to a second schema, the second schema having a complexity different from that of the first schema. The method can comprise accessing first and second depth models. In one embodiment, the first schema comprises the first depth model, and the second schema comprises the second model, and in a second embodiment the first schema comprises the first depth model, and the second schema comprises a combination of the first and the second depth models.

16 Claims, 11 Drawing Sheets

(56) References Cited

OTHER PUBLICATIONS

Liu, Yang et al "Extracting 3D Information from Broadcast Soccer Video" Science Direct Image and Vision Computing, vol. 24, 2006, pp. 1146-1162.
Grau, O. et al "A Robust Free-Viewpoint Video System for Sport Scenes" Proc. IEEE 3DTV Conference, 2007.
Inamoto, Naho et al "Intermediate View Generation of Soccer Scene from Multiple Videos" Pattern Recognition, 2002, IEEE Computer Society, vol. 2, pp. 713-716.
Koyama, Takayoshi et al "Live Mixed Reality 3D Video in Soccer Stadium" Mixed and Augmented Reality, 2003, pp. 178-187.
Inamoto, Naho, et al "Innmersive Observation of Virtualized Soccer Match at Real Stadium Model" Mixed and Augmented Reality, 2003, pp. 188-197.
Saito, Hideo et al "Sports Scene Analysis and Visualization from Multiple-View Video" 2004 IEEE Intl Conf. on Multimedia and Expo, vol. 2, pp. 1395-1398.
Huang, Yea-Shuan et al "Creating Depth Map from 2D Scene Classification" Innovative Computing Information and Control. Jun. 18, 2008.

* cited by examiner

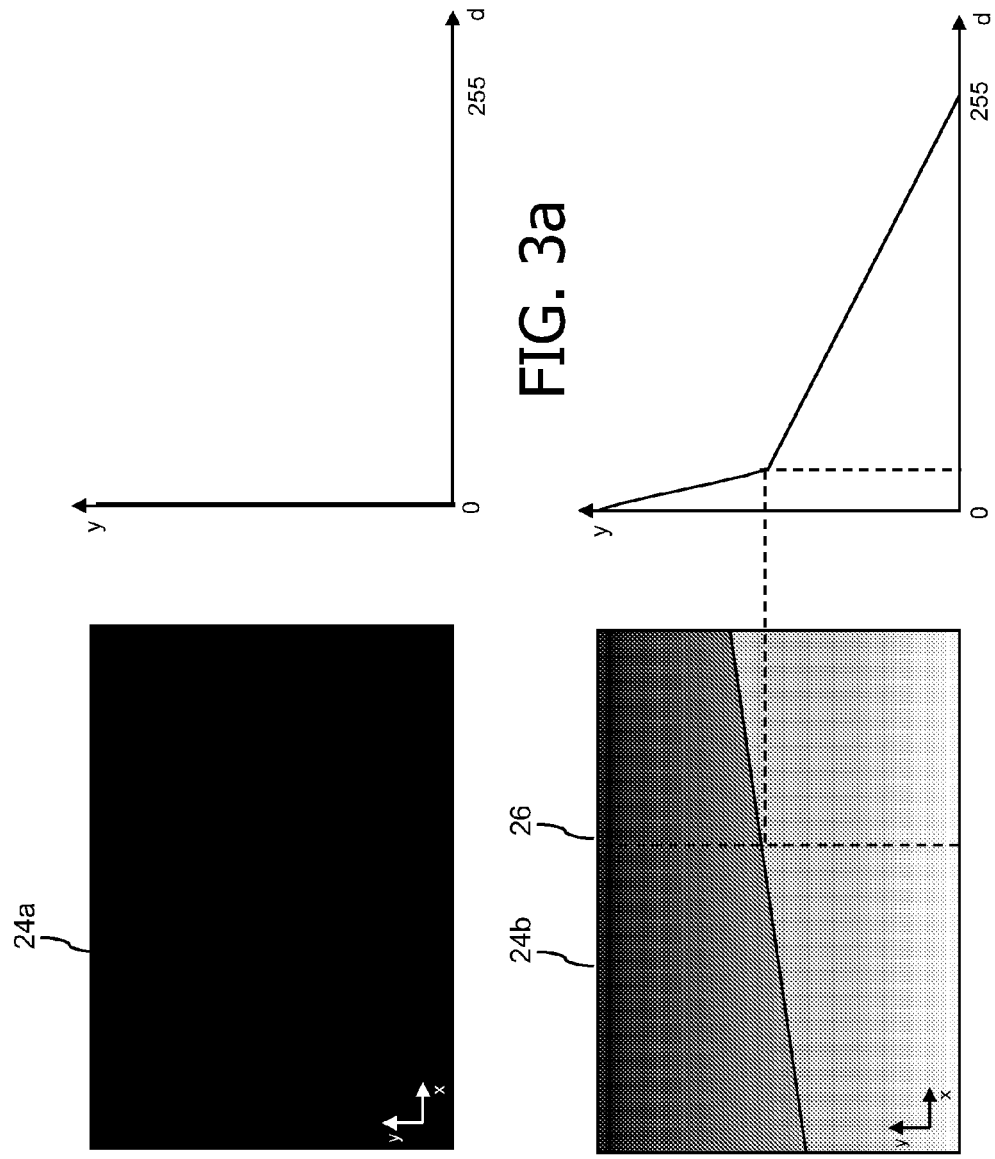

CREATION OF DEPTH MAPS FROM IMAGES

FIELD OF THE INVENTION

This invention relates to a method of, and system for, generating a plurality of depth maps for a plurality of images. In one embodiment, this can be used in the automatic depth estimation for soccer video.

BACKGROUND OF THE INVENTION

It is likely that in the near future three-dimensional (3D) display devices will become increasingly common in home and business environments. Such devices are either stereoscopic, which require the user to wear special glasses to see the 3D image, or autostereoscopic, which do not require any special glasses in order to see the 3D image. To create a 3D image, two different 2D images are needed, that are provided one to left eye of the user and one to the right eye of the user. It is also sufficient to provide a single image and either an additional depth map or disparity map, which contains sufficient information to allow the second image to be generated. This latter solution has a number of advantages because it allows more flexibility in the final delivery of the 3D image.

However it is the case that at the present time, and for the foreseeable future, most images and video will be generated as a 2D image frame. In order to create a 3D image when the original source is a 2D image, then a depth map needs to be created. This depth map can be used to create the second image, or to create a disparity map for a second image.

Much research has been performed recently on the topic of soccer analysis and conversion of 2D soccer video to 3D [see references 1 to 4]. Most of these approaches estimate a 3D model from the available data. Several approaches use multiple cameras that are manually/automatically calibrated [see references 1 and 4]. Generally, the calibration is done using intersections of the lines visible on the soccer field. This mainly works well in the area around the goals, where many lines are visible in a camera view. This method can be extended to the centre of the field by adding an ellipse detection method. Such an approach is less effective when very few lines (or no lines at all) are visible in a view. In this case, it is possible to use motion estimation to compute the homography between subsequent frames.

In generating a depth map, the next step is that the players and the ball are detected and their 3D positions are estimated, usually using color segmentation [reference 2]. Liu et al. use a Gaussian Mixture Model to detect the playfield [reference 2], while it is also known to use a histogram-based approach combining HSI and RGB colour-spaces. It is also possible to use the colours of shirts and pants of both teams, and detect combinations of shirts and pants. In this case it is possible to track separately multiple players that occlude each other using the colour of the shirts, their relative vertical position, and/or the average velocity of the players. The position of the ball can be easily estimated when it is on the ground, but is difficult to estimate in the air. In such a case, a parabolic trajectory is typically assumed, and therefore the two points where it touches the ground are required. Liu et al. manually indicate such points [reference 2]. A different solution is to use multiple cameras, or a single camera and the change in direction of the ball when it touches the ground.

The main application in those works is free viewpoint video, where a user can choose a view from an arbitrary viewpoint, interpolated from the captured viewpoints at the fixed camera positions. In such a case, a 3D reconstruction of the field, players and ball is often built from the input data. This process of placing the players and ball in the correct position on a virtual 3D soccer field puts additional requirements related to pose estimation of the players, or matting for more precise segmentation. If a player is not detected, he cannot be placed correctly on the 3D model.

In an application such as 3D TV, the main goal is to produce visually pleasing depth images. The constraints for such an application are different from those for free viewpoint video, and often less strict. For example, a player that is not detected receives the same depth values as the surrounding field pixels. This diminishes the depth effect, and gives a local distortion, but it does not create artefacts such as when a full 3D model is reconstructed. However, a high robustness and temporal stability are needed for a pleasing viewing experience.

The main problem with the existing methods is their failure for specific types of scenes. As described above, the camera calibration works well for scenes containing the goal, but performs much worse when a central part of the field is captured. Another problem of the existing methods is that they sometimes require setups with special cameras, for which costly adaptations to the capturing infrastructure need to be made.

The focus in the prior art algorithms is on producing correct 3D models, not on the 3D impression and robustness. To overcome issues with instability or weak points in the algorithms, many of the presented algorithms require a considerable amount of manual intervention to indicate, for example the line intersections, starting and ending points of the ball on the ground between a trajectory through the air, or corrections of players difficult to segment.

SUMMARY OF THE INVENTION

It is therefore an object of the invention to improve upon the known art. According to a first aspect of the present invention, there is provided a method of generating a plurality of depth maps for a plurality of images comprising receiving a first image, obtaining information relating to the shot defined by the first image, generating a depth map for the first image according to a first schema, receiving a second image, obtaining information relating to the shot defined by the second image, detecting a change in the obtained information between the first and second image, and generating a depth map for the second image according to a second schema, the second schema having a complexity different from that of the first schema.

According to a second aspect of the present invention, there is provided a system for generating a plurality of depth maps for a plurality of images comprising a receiver arranged to receive first and second images, and a processor arranged to obtain information relating to the shot defined by the first image, to generate a depth map for the first image according to a first schema, to obtain information relating to the shot defined by the second image, to detect a change in the obtained information between the first and second image, and to generate a depth map for the second image according to a second schema, the second schema having a complexity different from that of the first schema.

According to a third aspect of the present invention, there is provided a computer program product on a computer readable medium for generating a plurality of depth maps for a plurality of images, the product comprising instructions for receiving a first image, obtaining information relating to the shot defined by the first image, generating a depth map for the first image according to a first schema, receiving a second image, obtaining information relating to the shot defined by the second image, detecting a change in the obtained information between the first and second image, and generating a depth map for the second image according to a second schema, the second schema having a complexity different from that of the first schema.

Owing to the invention, it is possible to provide a solution for generating a depth map from an image which has increased robustness and stability by working with different schemas using depth models of varying complexity (for example, constant depth, sloping depth, or sloping depth with player segmentation). By obtaining information relating to the shot defined in each image, this information can be used as a trigger to switch schema. A schema, in its simplest implementation, is a depth model, which specifies one or more depth profiles for the ultimate depth map. A simple schema might be a depth model that specifies a single constant depth throughout a depth map. A more complex schema might be one that specifies a simple gradient over the depth map, and a yet more complex schema might specify a gradient plus the detection of one or multiple players (through segmentation for example). When a defined circumstance arises, such as the confidence in a scenario being too low, the algorithm automatically switches back to a lower (simpler) scenario (depth model) for which accurate reconstruction is possible. For example, if the player segmentation has a low confidence, only the field model is used, without player segmentation.

Also, in an application such as 3D display of video content, a precise calibration of the video to the actual field coordinates is not required. It is sufficient to model the transition between the field and the spectator area as a single straight line or a pair of two lines. This is a simpler model than used in current approaches, and is also sufficient for the needs of a 3D TV application. This invention can be used as an automatic/semi-automatic method of converting soccer video to 3D. It could be used by broadcasters, as well as other content providers that capture/distribute soccer material. The invention can also be embodied inside a television, which receives a 2D image input, converts the 2D stream to 3D, and then displays a 3D output.

There is provided a new algorithm that can be used for automatic 2D-to-3D conversion of sports video such as raw soccer video material, i.e. soccer videos, possibly with changes in camera views, but without graphical overlays. As opposed to most existing methods that aim at reconstructing a complete 3D model of the game being played, the method delivers a solution that will produce working depth maps, which typically results in less strict constraints. In order to obtain a robust conversion, there are introduced multiple schemas/scenarios that can use depth models of varying complexity (for example, constant depth, sloping depth, or sloping depth with player segmentation). When there is low confidence, it is possible to switch back to a simpler scenario/depth model. A lower complexity schema may be used when one or more defined criteria, such as a confidence below a threshold value, is detected.

Advantageously, the method comprises accessing first and second depth models, wherein the first schema comprises the first depth model, and the second schema comprises the second model. This is the simplest implementation of the new system, which uses two models, and switches between the models when the shot change has been detected. In a second embodiment, also using first and second depth models, the first schema comprises the first depth model, and the second schema comprises a combination of the first and the second depth models. In this way, a sudden change in the depth map is avoided, and a mix of the models is used to create the second schema.

In the second embodiment, preferably the method includes setting a mix factor according to the number of images since the first schema alone was last used to generate a depth map, the mix factor determining the relative contributions of the first and the second depth models. The use of a mix factor that is set based on the number of images since the change to the second schema was initiated ensures a smooth transition from one schema to the second schema.

Ideally the method also includes detecting one or more unreliable elements in the second image, wherein the second depth model is used for the or each detected unreliable element in the second image, and the first depth model is used for the remainder of the second image. The change in schema can also be used for local correction in the depth map for an image. An unreliable element can be encoded with the second schema rather than the first schema, if confidence about this part of the original image is low.

The decision on whether to switch from one schema to another is based upon the obtained information relating to the shot defined by an image. This information may be derived from the image itself, or may be derived from outside the image, using metadata, for example. This metadata may be carried with the respective image, or may be obtained from another source. Metadata is obtained that relates to the image.

In an advantageous embodiment, the obtained metadata comprises Electronic Program Guide (EPG) data. The EPG data typically specifies what program is currently is being transmitted. Knowing the type of program that is transmitted, a higher complexity schema can be used than a low complexity default schema. The low complexity schema could for example employ a schema based on a slant; i.e. a gradient depth map which is known to give a very stable yet a less well defined depth map. However if the EPG data indicates that the program currently being watched is a soccer match it is possible to switch to a higher complexity scheme tailored towards soccer matches such as presented herein below.

In another advantageous embodiment, the obtained metadata comprises the identity of the camera used to capture the image, and the step of detecting a change in the obtained information comprises detecting the use of a different camera for the creation of the second image with respect to the first image. If the location and type of shot being captured by a specific camera is known, then it is possible to use metadata about the camera that was used to create the current image as the basis for the switching to the lower complexity schema. For example, in a sports setting such as football, a camera placed behind the goal will very likely provide a close-up of the action, and the detection of a switch to this camera can be used as the basis for moving to a lower complexity schema.

In an alternative or additional embodiment, the obtained metadata comprises the focal length of the camera used to capture the image, and the step of detecting a change in the obtained information comprises detecting that the focal length of the camera is below a predetermined threshold for the creation of the second image. This metadata can be used to determine that a camera is focussing in on the action, and therefore there is likely to be a lower confidence in the generation of a complex 3D output. Again this can be used as the trigger for a switch to a lower complexity schema.

Preferably, the step of obtaining information relating to the shot defined by an image comprises processing the image. This method of obtaining information can be used instead of, or in addition to, the use of metadata in obtaining the information relating to the current shot. For example, in one advantageous embodiment, the processing of the image comprises determining the size of a predetermined object in the image, and the step of detecting a change in the obtained information comprises detecting that the size of the predetermined object in the second image is above a predetermined threshold. In this case, in the such sports environment, then an object such as a player, with a size above a certain level can be used to indicate a close-up. When this is detected, then the system can switch to a less complex schema.

In a further preferable embodiment, the processing of the image comprises determining the position of predetermined lines in the image, and the step of detecting a change in the obtained information comprises detecting that the position of the predetermined lines, in the second image, has spacing above a predetermined threshold. Since a characteristic of many sports activities is the presence of a plurality of lines or markings in the viewing area, these lines or markings can be detected within an image and then used to determine whether a close-up shot is currently being displayed. This can then be used to switch to a lower complexity schema for the calculation of the depth map. The preferred application of the invention is in soccer coverage, but the principle that applies to soccer fields can also be applied to other shaped fields, courts, rings, diamonds, decks or pitches with lines or distinguishable edges. Examples of which are a baseball diamond, a basketball court, a football field, an ice-hockey ring, a tennis court, a cricket pitch or even a shuffleboard deck.

In a similar manner, a switch back to a higher complexity schema will be made once there has been a reversal in the information, such as the confidence level, that led to the switch in the model being used. The system will switch between schemas as and when the information relating to the current shot indicates that a change in complexity of the schema is desirable. The simplest embodiment of the invention is the provision of two depth models, one of which is constant depth map, and the other is more complex depth map using gradients. The system will switch between the two models as determined by the metadata and/or processing of the image, to determine the information about the current shot, such as whether a close-up or wide-angle shot is the current image.

BRIEF DESCRIPTION OF THE DRAWINGS

Embodiments of the present invention will now be described, by way of example only, with reference to the accompanying drawings, in which:—

BRIEF DESCRIPTION OF EMBODIMENTS

Figure 1:
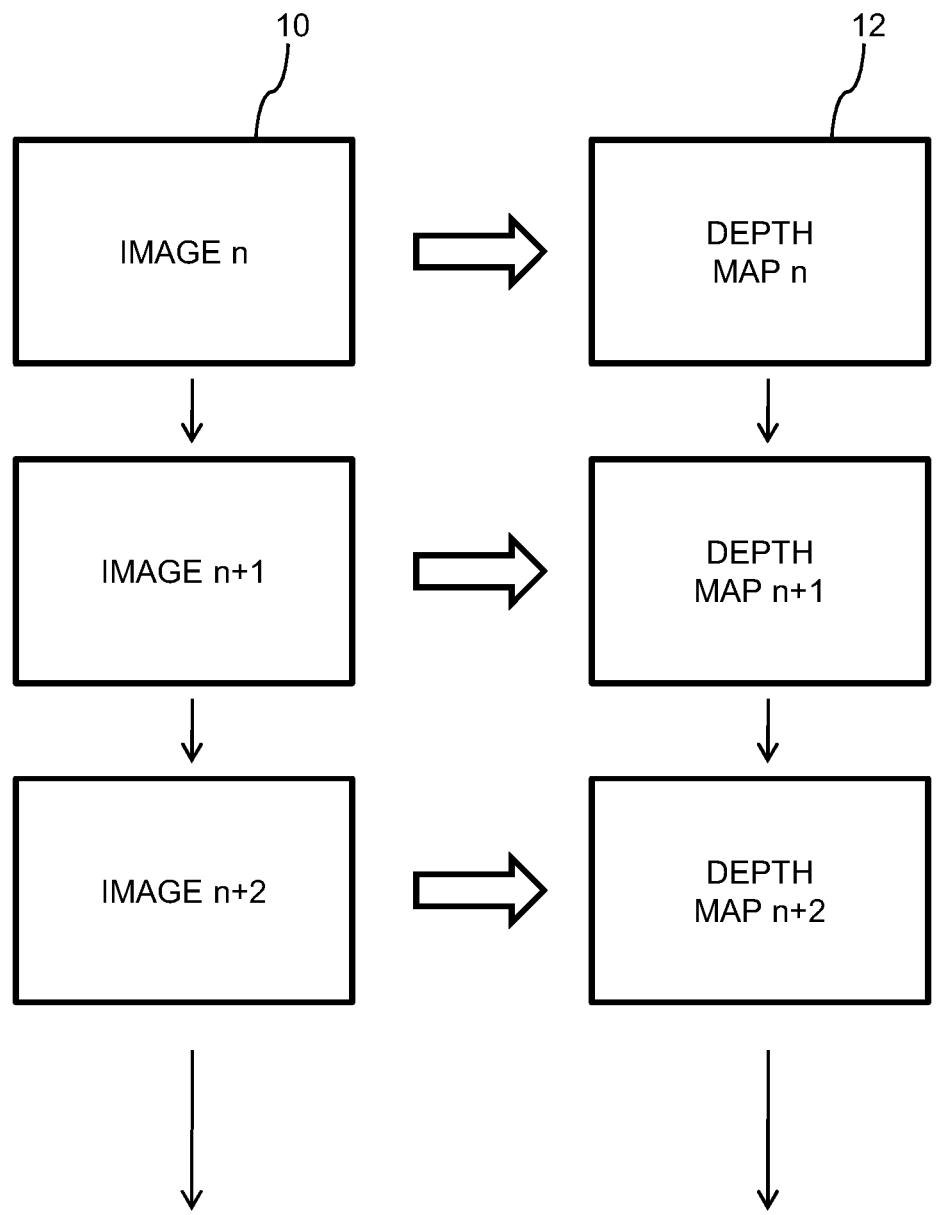
FIG. 1 is a diagram of a plurality of images and a plurality of depth maps.

The basic principle is illustrated in FIG. 1. Video to be displayed comprises a series of images 10 also referred to as frames in many situations, which are used to generate a corresponding series of depth maps 12, each image 10 having a respective depth map 12. The generation of the depth map supports the generation of a 3D image at the ultimate display device, from the original 2D format, which is represented by the series of images 10. A depth map 12 can be used to generate one or more additional images that are then used, along with the original image 10, in an autostereoscopic or stereoscopic display device. A depth map 12 can also be used to generate a disparity map, if that is needed by the specific 3D application.

As discussed above, in respect of the prior art cited in the references, the generation of such depth maps 12 from source images 10 is well known. The present invention provides an improvement in the method of generating the depth maps 12, in order to provide an automated real-time method that will generate depth maps 12 that when used in a 3D system, which will provide a solution that does not deteriorate in specific situations, as is known to be the case with current solutions.

Figure 2:
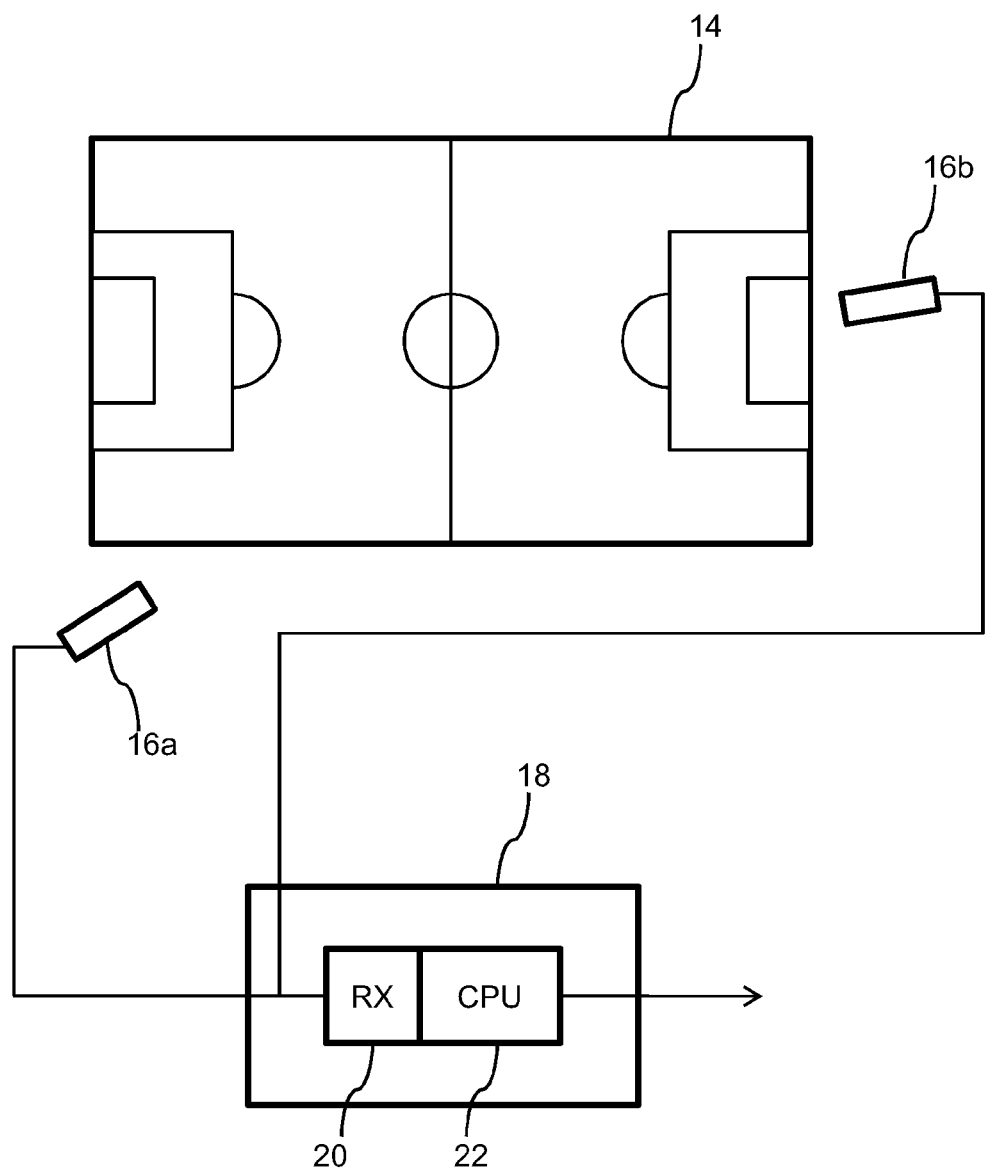
FIG. 2 is a schematic diagram of a system for generating the depth maps.

The algorithm embodied in the current system is for the automatic 2D-to-3D conversion of soccer video works on the raw video signal, without graphical overlays (such as channel information, current score, etc). FIG. 2 shows an example of such a system. A sports field 14 is covered by multiple cameras 16. Only two cameras 16 are shown, for ease of illustration, but it will be appreciated that in a practical implementation many more cameras 16 will be used. Camera 16a provides a wide-angle view of the playing field 14, and camera 16b provides a close-up of the action behind the goal mouth area.

The cameras 16 are connected to a device 18, which principally comprises a receiver 20 and a processor 22. The receiver 20 is arranged to receive the plurality of images 10 from the cameras 16 and the processor 22 is arranged to generate the depth maps 12 for the respective images 10, as per the description of FIG. 1. The device 18 can be considered to be located within the outside broadcast unit of a television broadcast system that is present at the sports field 14. In this way a live 3D feed can be provided by the broadcaster, which can be carried in addition to the 2D feed, so that those end users who have a 3D display device can have the video displayed to them in 3D. It should be noted however that the device 18 could be located at the receiver end of the broadcast chain, in which case a suitably enabled receiving device, such as an advanced digital television, will perform the conversion of the original 2D signal to a 3D signal.

The system 18 can handle switches from one camera 16 to another, as the processor 22 processes the video on a frame-by-frame basis. The processor 22 computes the depth image 12 in four main steps. First, there is detected the candidate soccer field pixels using a colour thresholding technique. Then there is detected the edge of the soccer field as the transition between the grass and the spectator area. Next, there is detected the players, and finally, the depth map 12 is assigned using the detection information. These steps are described in the detail in the following sections. For the purpose of the example embodiment, there is used a system which uses frames of a size 960×540 pixels, but the system can be adapted to be used with any frame size.

Figure 3C:
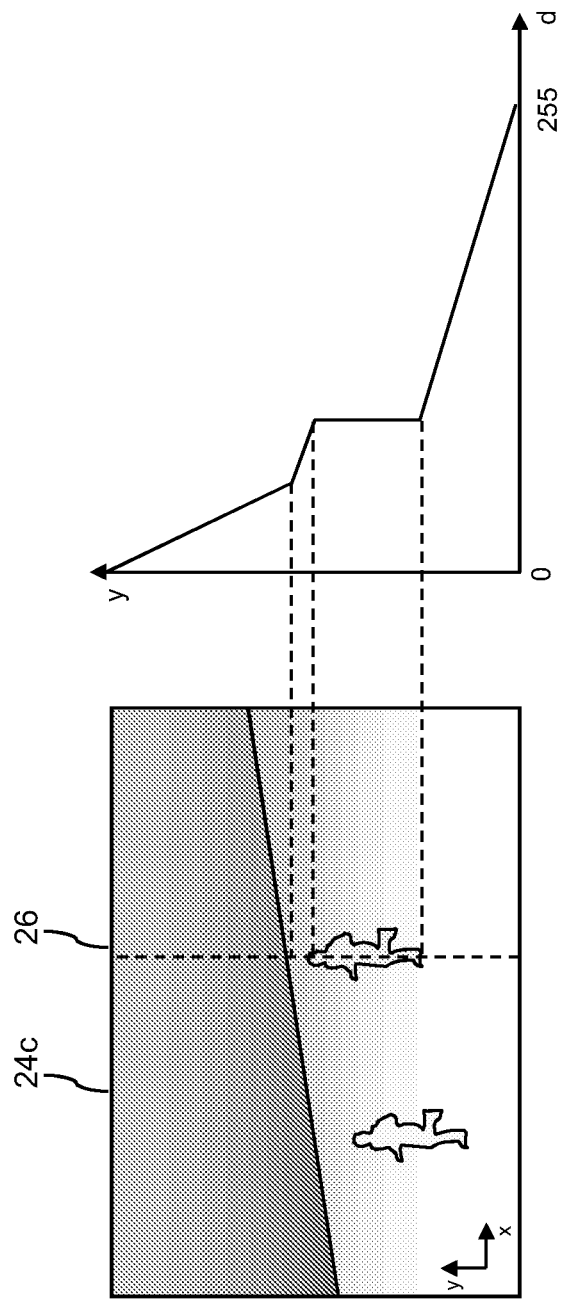
FIG. 3 is a diagram of various depth models.

In generating the depth maps 12, there are utilised different schemas (scenarios) using depth models of increasing complexity, as shown in FIG. 3. This Figure shows three different depth models 24. FIG. 3a shows scenario 0, which is a 2D image with all pixels at a fixed depth, FIG. 3b shows scenario 1, which is a depth image using only the field and spectator area depth models, no players and FIG. 3c represents scenario 2, which is a depth image using field, spectator area, and player models. By default, the system 18 uses scenario 2. In the next sections there is presented the depth map generation algorithm in detail. Following this, the switching between different scenarios is further discussed. The system switches to a lower complexity model, when confidence in the ability to operate the current model is low.

To explain the depth models 24 and depth maps 12 in more detail, it should be understood that a depth map 12 assigns to a pixel, within an image 10, a depth value that corresponds to the relative depth of that pixel. In the example of FIG. 3, the depth values range from 0 to 255, with 255 being the depth closest to the viewer. To easily visualise the concept of depth, these values can be represented as a grey scale value, with 0 represented by black and 255 represented by white. Intermediate values are represented by the appropriate level of grey.

In FIG. 3a a constant depth of 0 is assigned to all pixels, hence the black image on the left hand side of the Figure. On the right hand side of FIG. 3a is a vertical slice through the depth model 24a, showing the depth value of 255 across the entire y axis at the slice (which can be taken anywhere in the model as it is uniform). Depth model 24b is more complex, and assigns a small amount of the potential depth range to a strip at the top (which will correspond to the crowd) and a greater range to the lower part of the model (the playing surface). The right hand graph is a slice through the model 24b on the line 26. Depth model 24c is similar to 24b, but also assigns depths to detected elements such as players, within the image 10. Again the right hand graph is a slice through the model 24c on the line 26.

Figure 4:
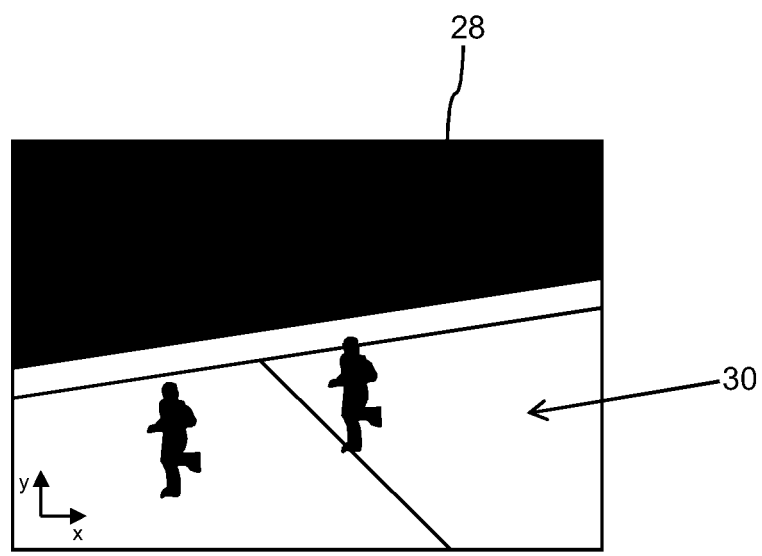
FIGS. 4 to 7 are diagrams of various binary masks.

The first stage in the generation of the depth map 12 is the detection of candidate soccer field pixels. A pixel i is a candidate field pixel if the following constraints on its colour hold: $R_i < G_i$, $G_i > 80$, $1.2 B_i < G_i$, where $G_i$, and $B_i$ are the 8-bit red, green, and blue colour components of pixel i, respectively. This processing will result in the production of a binary mask $M_1$ of candidate soccer field pixels. This is shown in FIG. 4, which illustrates the binary mask 28 of candidate soccer field pixels 30. The mask 28 is binary in the sense that every pixel is either a candidate pixel 30 (shown as white) or is not (shown in black). This process approximately determines the current field of play within the image 10 being processed.

The second stage in the processing of the image 10 to generate the respective depth map 12 is the detection of a field edge within the image 10. The field edge is where the field of play meets the spectator area, within the image 10. The field edge is detected using a double scanning method on the candidate field pixels, firstly a top-down method, working down from the top of the image 10 and secondly a bottom-up method, working up from the bottom of the image 10.

Figure 5A:
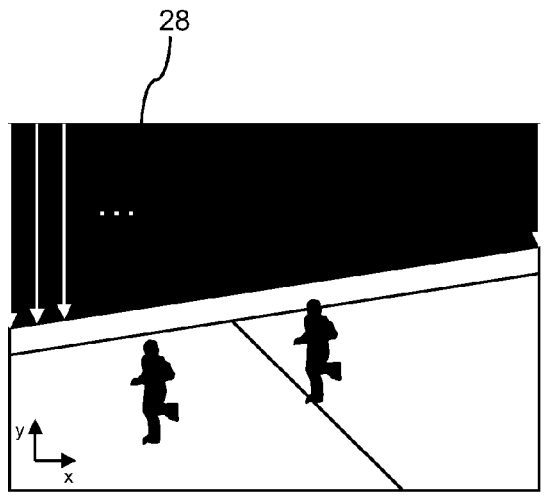
Figure 5A:
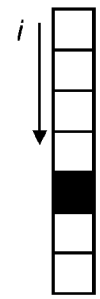

FIG. 5a shows the top-down method. For twenty regularly spaced columns in the field, the column is scanned from top to bottom, until the first pixel i is found for which six out of the next seven pixels (below) is green. This is taken as a sample of the field edge. Next, a line $f_1$ is robustly fit through these twenty points (one in each column) using a least median of squares (LMedS) method, with 100 sample evaluations. The robust fit ensures that there is removed noise and also outliers, such as samples from spectators with green clothing.

Figure 5B:
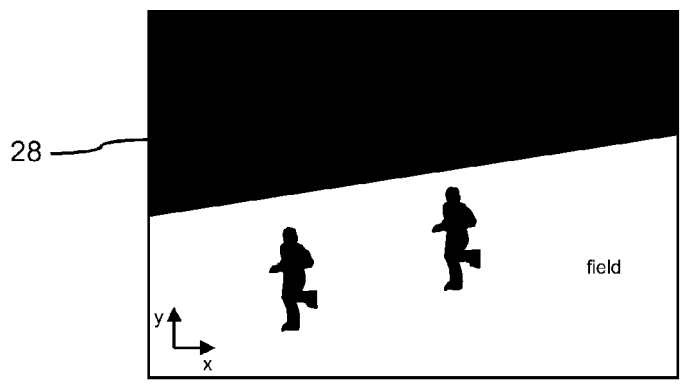

FIG. 5b shows the bottom-up method. First, there is performed a dilation followed by an erosion using a 15×15 filter on the candidate field pixel mask $M_1$, resulting in a new binary mask $M_2$. This is done to include the field lines in the candidate field mask. A connected components labelling is then performed on $M_2$ and the largest component is selected as the soccer field. For each column, the top pixel of this region is selected as sample of the field edge (or the bottom pixel of the image if no pixel in that column is part of the field region). Next, a robust line fit $f_2$ is computed through these points using an LMedS method, as above, with 100 sample evaluations. Again, the robust fit ensures the removal of noise and outliers, such as players connected with the field edge.

Figure 5C:
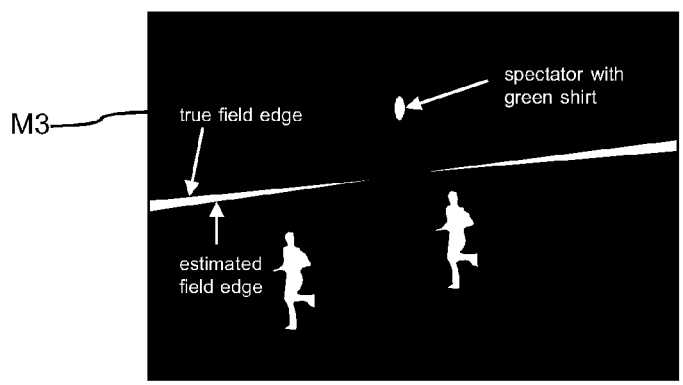

For both fits $f_1$ and $f_2$, there is then computed a mask $M_3$ containing the candidate field pixels above the estimated field edge and the non-candidate pixels below the estimated edge. There is kept the fit with the lowest number of "1" pixels in mask $M_3$, and this is called the fit f. This mask $M_3$ is shown in FIG. 5c. The error mask $M_3$ shows candidate field pixels above the estimated field edge and non-candidate field pixels below the estimated field edge.

Figure 6A:
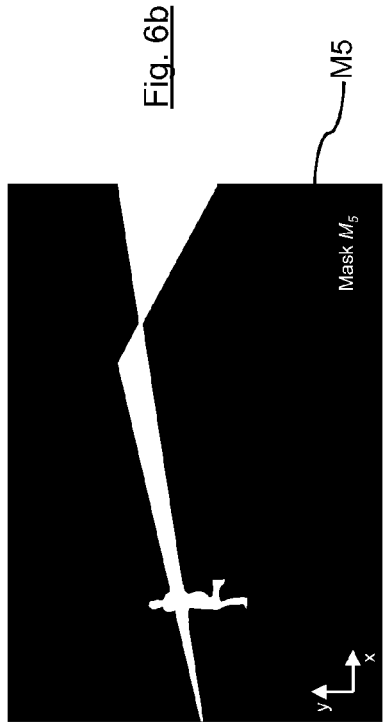
Figure 6B:
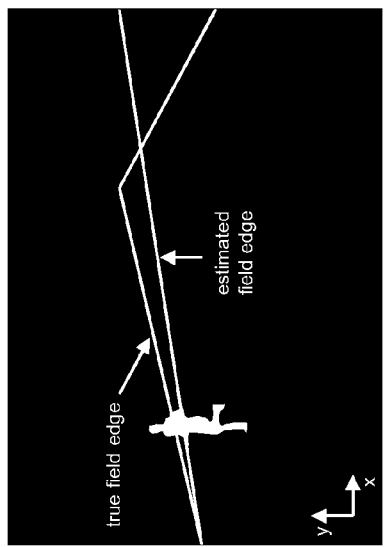
Figure 6C:
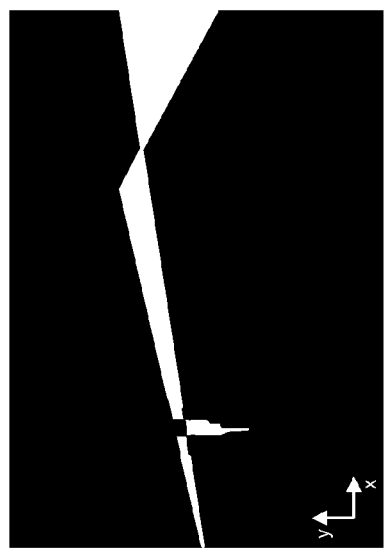
Figure 6D:
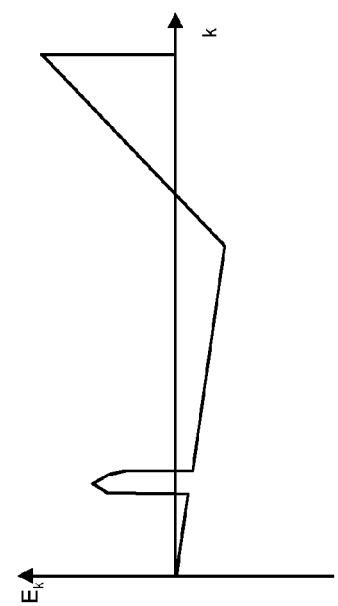

Next, there is computed a new error measure e counting the pixels not fitting the model that are vertically connected to the estimated field edge. Firstly there is added the pixels on the line f to the binary mask $M_3$, resulting in a new mask $M_4$, on which there is performed a connected components labelling. There is kept all of the components connected to the line f, and the new mask with the labelled component $M_5$. This mask is shown in FIG. 6b. For each column i, there is counted both the number of pixels of this component below and above the line f until the first transition from 1 to 0 in the mask $M_5$, and there is kept the largest number (above or below the line). It is arbitrarily chosen to label the pixels below the line as positive, and the ones above as negative values. The advantage of counting only until the first transition and not just the sum of all the labelled pixels on a column is that field lines etc. that are connected at a certain point can be removed (see also FIG. 6c). This results in a vector E of W integer values indicating the number of pixels that do not fit the line model (with W the width of the image, see FIG. 6). The sum of the absolute values of the elements of this vector e is represented as follow:

$$e = \sum_{k=0}^{W-1} |E_k|$$

where k is the column number ($0 \leq k < W$).

FIG. 6 shows the various masks used in the calculation of the error measure E. FIG. 6a shows the estimated field edge and true field edge. FIG. 6b shows the mask $M_5$ of pixels connected to the field edge. FIG. 6c shows the pixels to be counted per column, showing the pixels after the first 1-0 transition have been removed. FIG. 6d shows the error measure E as a function of the column. If this error measure e is above a threshold of 500 pixels, it is possible to conclude that there is a corner in the image, and a two-line model should be fitted. A robust line f is fitted through the points for which $E_i > 10$ using LMedS (as per the methodology of FIG. 5). The intersection of this new line f with the original line f is computed, and a new LMedS fit is performed separately for the points to the left and the right of this intersection. There is now calculated an error measure e' for this two-line fit, which is compared with the error for the single-line fit e, and the best one is kept.

Figure 7A:
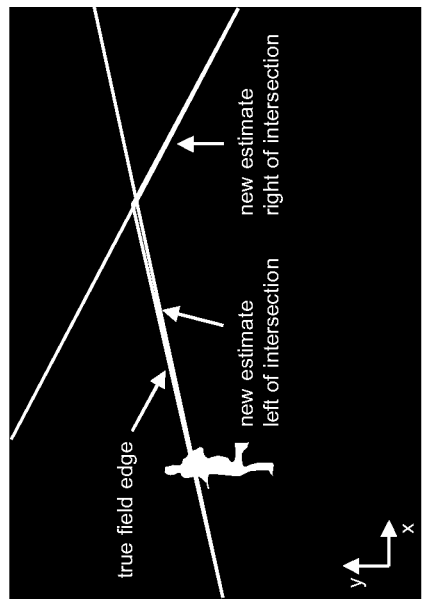
Figure 7B:
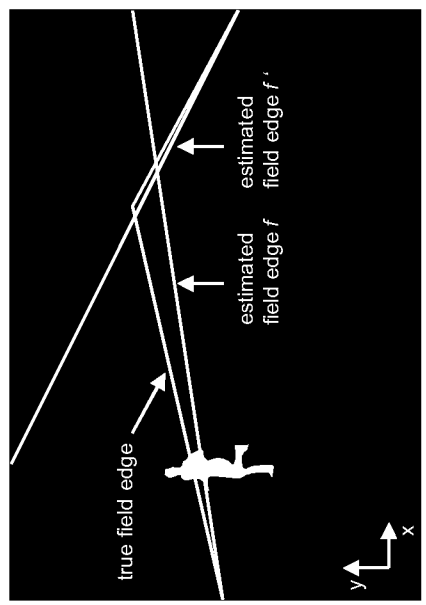

FIG. 7 shows the method of using a two-line fit to the field edge. In FIG. 7a, a second line is fitted through the points with largest error value, and in FIG. 7b a new fit is performed through points on both sides of the intersection between the two line fits. The detection of the two-line situation in the original image 10 is necessary, as a significant proportion of the images 10 will fall into this category. This occurs when the camera 16 is focussing on a specific part of the field, which includes the corner area of the playing field. The two-line fit determines a method of reasonably accurately determining the corner shape of the playing field within the image 10.

Figure 8:
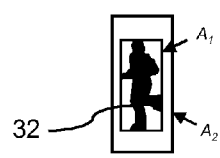
FIG. 8 is a schematic diagram of a detected object in an image with two bounding boxes.

The third stage in the process of generating the depth map 12 for the image 10 is player detection. In this process firstly, the candidate players are detected using a connected component labelling on a binary mask $M_6$ that is computed using an erosion followed by two dilation steps (using a 5×5 filter) on the inverse of the binary candidate field pixel mask $M_1$, multiplied with the estimated field (1 below the field edge, 0 on and above the edge). This operation removes the field lines from $M_1$, but will also (accidentally) remove fine body parts (for example legs or arms) from players (which will be added back again later). This process detects those non-green areas of the defined playing field (defined by the detected field edge) that have sufficient pixel size to possibly be players. Next, a check is performed for each candidate player using the following conditions. The area must be larger than fifty pixels and the height of a bounding box A1 must be larger than its width. FIG. 8 shows the principle of the player detection. An area 32 is checked according to the two conditions above. The object 32 must be at least 50 pixels in size, and the box A1 bounding the object 32 must have a height greater than its width.

For each candidate object 32, there is then assigned to that player 32 the pixels of $M_1$ that are inside a second bounding box A2 of 50 pixels higher, and 10 pixels wider, than the original bounding box A1 around the candidate player 32. The larger bounding box A2 is used in order to be able to add back the small parts of the body that had been eliminated in the earlier erosion step. In order to include also the blended pixels, there is also performed a 5×5 dilation on the resulting player labels.

At this stage there is also removed any candidate players that touch the top boundary of the field (as shown for example in FIG. 7), as the probability of having detected the entirety of these players is very low. The system will only detect player candidates below the estimated field edge(s). If the system were to retain the candidates touching the top boundary, it could be that half a player is detected, resulting in very disturbing artefacts. Additionally, once this has been completed, the average player size $S_p$ is then computed as the median of the player heights that are larger than a minimum of 40 pixels.

Figure 9A:
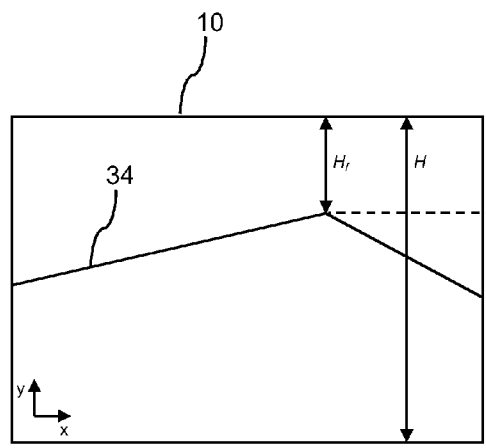
FIG. 9 is a diagram showing assignment of depth slopes over different parts of the image.
Figure 9B:
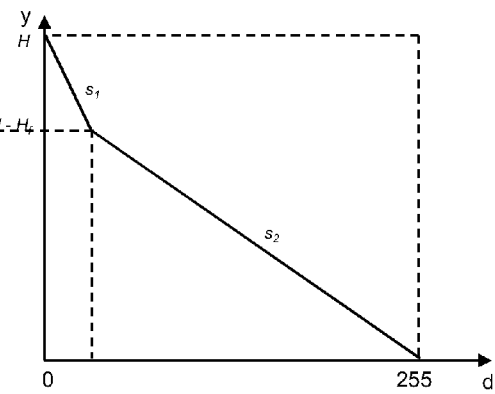
Figure 10A:
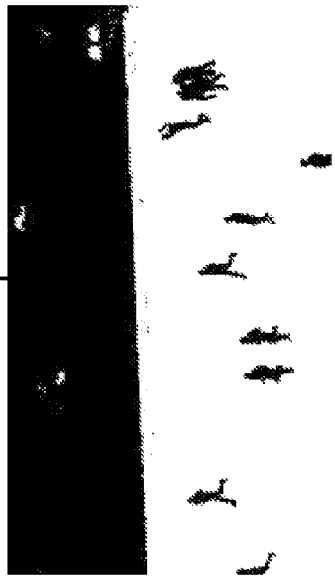
FIG. 10 is a diagram showing the generation of a depth map for an image.
Figure 10B:
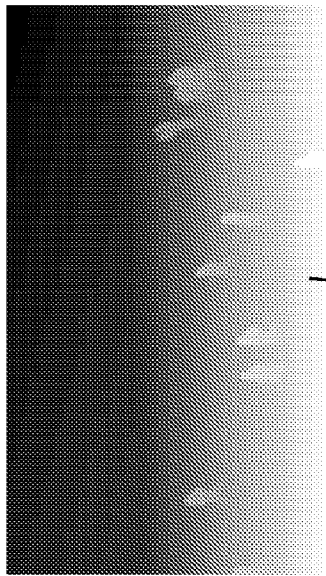
Figure 10C:
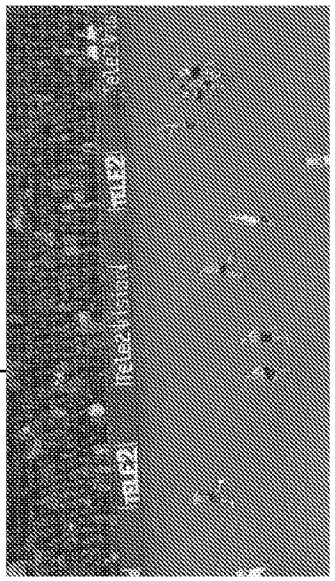
Figure 10D:
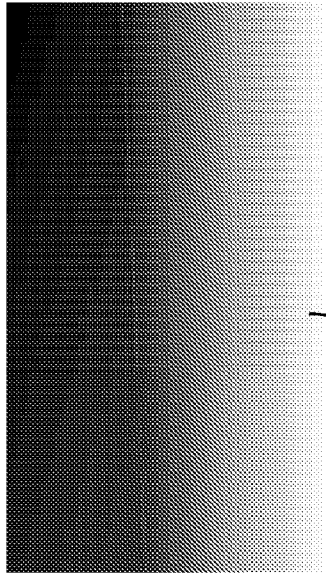

The fourth stage in the process is the depth map assignment. To perform this step it is necessary to calculate the depth slope of the spectator area and the soccer field, as shown in FIG. 9. The spectator area has a fixed slope $s_1$:

$$s_1 = 0.2 * 255/H,$$

where H is the image height in pixels. The slope of the field $s_2$ uses the remaining depth range:

$$s_2 = (255 - s_1 * H_f)/(H - H_f),$$

with $H_f$ the minimum of the spectator area height (in pixels). FIG. 9 illustrates the calculation of the depth slope of the spectator area and soccer field. The image 10 in FIG. 9a has been divided into two areas, above the line 34, which is the spectator area, and below the line 34, which is the sports field area. The amount of depth available to each area is shown in FIG. 9b, which effectively assigns a greater proportion of the available depth from 0 to 255 in the depth map to the playing field area. The calculated $H_f$ determines the ratio between the amounts of depth assigned to each area.

The depth map 12 can then be computed in a scan from the bottom to the top of the image, starting with a depth of 255 at the bottom and decreasing first with field slope $s_2$ and then with spectator slope $s_1$. In a second scan, the depth of all the pixels of a player is set to the field depth of its bottom pixel. In this way a detected player 32 has a depth assigned to it that corresponds to the point in the image 10 at which they touch the ground. This depth value is then used for all of the pixels making up the player 32. This contrasts with the depth values for pixels for the ground, which will be increasing for each pixel row of the ground.

FIG. 10 illustrates the different steps of the soccer conversion algorithm described above. FIG. 10a shows the input frame 10. FIG. 10b shows the candidate soccer field pixel mask 28 ($M_1$). FIG. 10c shows the detected field edge and the depth map 12 with two slopes, corresponding to scenario 1 above, and FIG. 10d shows the detected players and the depth map 12 corresponding to scenario 2 above. The main advantage of the present system is delivered by the switching behaviour between different scenarios (schemas). This can be done at two levels, either or both of globally and/or locally. The device 18 can switch back globally to a lower complexity scenario (depth model) if the overall confidence in the current depth model is too low. This is done, for example, when a camera 16 is used for close-ups. One method by which a close-up shot can be detected is a shot where the estimated average player height $S_p$ is larger than a predetermined size, for example 150 pixels (see above for the estimation of the average player height $S_p$). In general, both field detection and player segmentation are not very accurate and stable for close-up shots, so in that case, the device 18 will switch back to Scenario 0.

The device 18, specifically the processor 22 of the device 18, is arranged to generate the depth map 12 for the first image 10 according to the first schema (such as scenario 2), to detect a change in information relating to the shot in a second image 12, and therefore generate the depth map 12 for the second image 10 according to a second schema, the second schema being different from the first schema, for example as scenario 0. The detecting of the change in the information about the shot defined in the second image 10 can comprise processing the image 10, for example by detecting that the size of a predetermined object (such as a player) in the second image 10 is above a predetermined threshold.

Other methods of detecting the change in the information about the current shot can be used. For example, the step of detecting a change in the obtained information between the first and second images 12 could be accomplished by detecting the use of a different camera 16 for the creation of the second image 10 with respect to the first image 10. This can be seen in FIG. 2, for example, where a change from camera 16a to camera 16b (made by the director of the sport coverage) as the ultimate output in the broadcast could result in the use of a different (lower complexity) schema for the generation of the depth map 12. Since camera 16b is much more likely to be a close-up of the action, then scenario 0 can be used for the depth map generation. Metadata from the camera 16 that is capturing the video can also be used as a method of detecting the shot change. For example, the focus change will indicate that a camera 16 is zooming in to the action.

The switching from one scheme to another scheme, such as from Scenario 2 to Scenario 0 can be done gradually using a mixing coefficient $\alpha_t$ for frame t. The final depth frame $D^0_t$ at frame t is a mixture of the computed depth frame using Scenario 2 and the computed depth frame using Scenario 0 (which is 0 for Scenario 0, but would be non-zero when switching to Scenario 1):

$$D_t = \alpha_t D_t^2 + (1-\alpha_t) D^0_t$$

The mixing coefficient $\alpha_t$ is computed from the mixing coefficient $\alpha_{t-1}$ at the previous frame t−1 using:

$$\alpha_t = \max(0.9\alpha_{t-1}, 0.1) \text{ if } Sp > \text{var}$$

$$\alpha_t = \min(1.1\alpha_{t-1}, 1) \text{ if } Sp \leq \text{var}$$

where the maximum in the first and the minimum in the second equation are taken to bound the coefficient between 0.1 and 1, and the variable "var" will depend upon the image size, and could be set at 150, for example. In practice, this mixing gradually decreases the depth range to approximately 0 (scenario 0, after rounding of the depth map), and increases it again gradually when switching back to scenario 2.

The processor 22 accesses first and second depth models, wherein the first schema comprises the first depth model, and the second schema comprises a combination of the first and the second depth models. In one embodiment, the processor 22 sets the mix factor $\alpha_t$ according to the number of images 10 since the first schema alone was last used to generate a depth map 12, the mix factor $\alpha_t$ determining the relative contributions of the first and the second depth models. Since the depth value for a pixel is a numerical value, for example on a scale of 0 to 255, then the mix factor determines a weighted average from the two different schemes as the actual value to be used in the depth map 12. As more frames 10 are received that maintain a close up, then scenario 0 contributes more and more to the depth map. This ensures that there is not a sudden change in the scenario being used, which can lead to visual artefacts.

Additionally, the device 18 can also switch locally between scenarios, if only the local confidence in the model (typically detected players) is too low. As discussed above, specific players for which the certainty is too low, are not included in the model. This is done for player candidates that intersect with the estimated top edge of the field, because there is generally also a part of the player above this edge which is not detected. Also discarded are candidate players for which the height is smaller than the width. Similarly, the device 18 discards candidate players with a height larger than 1.5 times the estimated average player height $S_p$. These candidates typically consist of multiple players that are connected in the current frame or a player that is detected in combination with part of the lines on the field. In such cases, the processor will locally use only the field model (Scenario 1) and ignore the player (Scenario 2). As a result, these players get the same depth as the soccer field around them. This decreases the overall depth effect, but also avoids visible artefacts, and results in a very stable algorithm.

In performing the local switch in the depth map, the processor 22 is detecting one or more unreliable elements in the second image 10, wherein the second depth model is used for each detected unreliable element in the second image 12, and the first depth model is used for the remainder of the second image 12.

Figure 11:
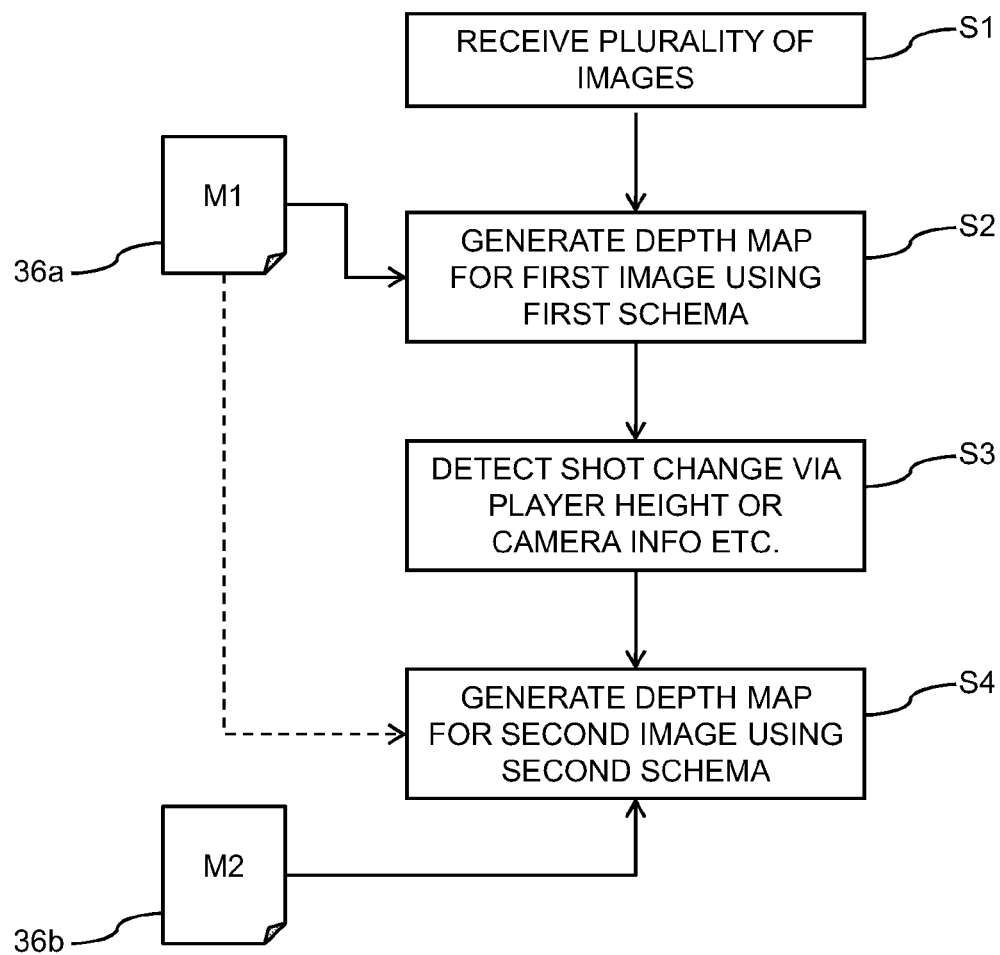
FIG. 11 is a flowchart of a method of generating a depth map.

FIG. 11 summarises the method of generating the plurality of depth maps 12 for a plurality of images 10. The method comprises, at step S1, the receiving of the plurality of images. At step S2 there is carried out the generating of a depth map for a first image 10 according to a first schema. The first schema is shown as comprising a first model 36a. The next step is the step S3 of detecting a shot change in a second image, and the final step S4 is the step of generating a depth map 12 for the second image 10 according to a second schema, the second schema being different from the first schema. The second schema is shown as comprising a second model 36b. The dotted line from the model 36a indicates, however, that the second schema could be a mix of the two models 36a and 36b. In this way, when confidence in an image 12, or in a part of an image 12 is low, then a different model is used. The shot change is used to determine that the confidence is low.

REFERENCES

[1] O. Grau, G. A. Thomas, A. Hilton, J. Kilner, and J. Starck, A Robust Free-Viewpoint Video System for Sport Scenes, Proc. IEEE 3DTV Conference, 2007.
[2] Y. Liu, D. Liang, Q. Huang, and W. Gao, Extracting 3D Information from Broadcast Soccer Video, Image and Vision Computing, Vol. 24, pp. 1146-1162, 2006.
[3] T. Bebie and H. Bieri, SoccerMan-Reconstructing Soccer Games from Video Sequences, Proc. IEEE International Conference on Image Processing, pp. 898-902, 1998.
[4] S. Würmlin and C. Niederberger, Method and System for Generating a Representation of a Dynamically Changing 3D Scene, EU Patent No. EP 1 862 969 A1, December 2007.

The invention claimed is:

1. A method of generating a plurality of depth maps (12) for a plurality of images (10) comprising:
receiving a first image (10),
obtaining information relating to the shot defined by the first image (10),
generating a depth map (12) for the first image (10) according to a first schema (24),
receiving a second image (10),
obtaining information relating to the shot defined by the second image (10),
detecting a change in the obtained information between the first and second image (10), and
generating a depth map (12) for the second image (10) according to a second schema (24), the second schema (24) having a complexity different from that of the first schema (24).

2. A method according to claim 1, and further comprising accessing first and second depth models (24c, 24a), wherein the first schema (24) comprises the first depth model (24c), and the second schema (24) comprises the second model (24a).

3. A method according to claim 1, and further comprising accessing first and second depth models (24c, 24a), wherein the first schema (24) comprises the first depth model (24c), and the second schema (24) comprises a combination of the first and the second depth models (24c and 24a).

4. A method according to claim 3, and further comprising setting a mix factor ($\alpha_t$) according to the number of images (10), the mix factor ($\alpha_t$) determining the relative contributions of the first and the second depth model (24c and 24a) to the depth map (12) for the second image (10).

5. A method according to claim 3, and further comprising detecting one or more unreliable elements in the second image (10), wherein the second depth model (24a) is used for the or each detected unreliable element in the second image (10), and the first depth model (24c) is used for the remainder of the second image (10).

6. A method according to claim 1, wherein the step of obtaining information relating to the shot defined by an image (10) comprises obtaining metadata relating to the image (10).

7. A method according to claim 6, wherein the obtained metadata comprises the identity of the camera (16) used to capture the image (10), and the step of detecting a change in the obtained information comprises detecting the use of a different camera (16) for the creation of the second image (10) with respect to the first image (10).

8. A method according to claim 6, wherein the obtained metadata comprises the focal length of the camera (16) used to capture the image (10), and the step of detecting a change in the obtained information comprises detecting that the focal length of the camera (16) is below a predetermined threshold for the creation of the second image (10).

9. A method according to claim 1, wherein the step of obtaining information relating to the shot defined by an image (10) comprises processing the image (10).

10. A method according to claim 9, wherein the processing of the image (10) comprises determining the size of a predetermined object in the image (10), and the step of detecting a change in the obtained information comprises detecting that the size of the predetermined object in the second image (10) is above a predetermined threshold.

11. A method according to claim 9, wherein the processing of the image (10) comprises determining the position of predetermined lines in the image (10), and the step of detecting a change in the obtained information comprises detecting that the position of the predetermined lines in the second image (10) has a spacing above a predetermined threshold.

12. A system for generating a plurality of depth maps (12) for a plurality of images (10) comprising:
   a receiver (20) arranged to receive first and second images (10), and
   a processor (22) arranged to obtain information relating to the shot defined by the first image (10), to generate a depth map (12) for the first image (10) according to a first schema (24), to obtain information relating to the shot defined by the second image (10), to detect a change in the obtained information between the first and second image (10), and to generate a depth map (12) for the second image (10) according to a second schema (24), the second schema (24) having a complexity different from that of the first schema (24).

13. A system according to claim 12, and further comprising a plurality of cameras (16) arranged to capture the images (10), wherein the processor (22) is arranged, when obtaining information relating to the shot defined by an image (10), to obtain metadata relating to the image (10), from a camera (16).

14. A system according to claim 13, wherein the obtained metadata comprises the identity of the camera (16) used to capture the image (10), and the processor (22) is arranged, when detecting a change in the obtained information, to detect the use of a different camera (16) for the creation of the second image (10) with respect to the first image (10).

15. A system according to claim 13, wherein the obtained metadata comprises the focal length of the camera (16) used to capture the image (10), and the processor (22) is arranged, when detecting a change in the obtained information, to detect that the focal length of the camera (16) is below a predetermined threshold for the creation of the second image (10).

16. A computer-readable, non-transitory medium having stored therein instructions for causing a processing unit to execute a method for generating a plurality of depth maps (12) for a plurality of images (10), the medium comprising code for:
   receiving a first image (10),
   obtaining information relating to the shot defined by the first image (10),
   generating a depth map (12) for the first image (10) according to a first schema (24),
   receiving a second image (10),
   obtaining information relating to the shot defined by the second image (10),
   detecting a change in the obtained information between the first and second image (10), and
   generating a depth map (12) for the second image (10) according to a second schema (24), the second schema (24) having a complexity different from that of the first schema (24).

\* \* \* \* \*